Feb. 21, 1939.  H. WAITZMAN  2,148,143
METHOD OF KEEPING BAKED BREAD-LOAVES
Filed June 13, 1938  3 Sheets-Sheet 1
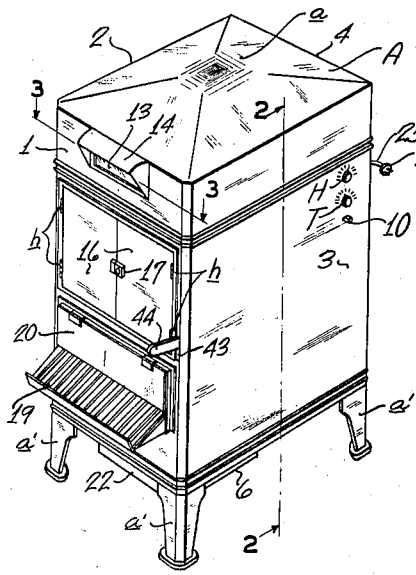
FIG. 1.
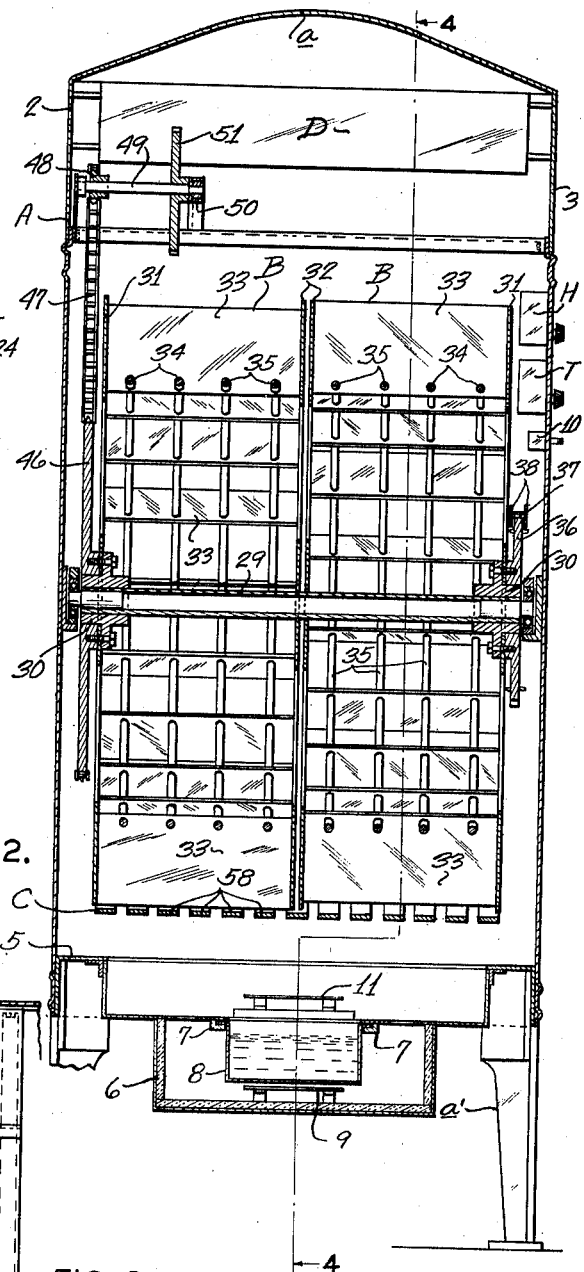
FIG. 2.
FIG. 3.
INVENTOR
HYMAN WAITZMAN
BY
ATTORNEY

INVENTOR
HYMAN WAITZMAN

Feb. 21, 1939. H. WAITZMAN 2,148,143
METHOD OF KEEPING BAKED BREAD-LOAVES
Filed June 13, 1938 3 Sheets-Sheet 3
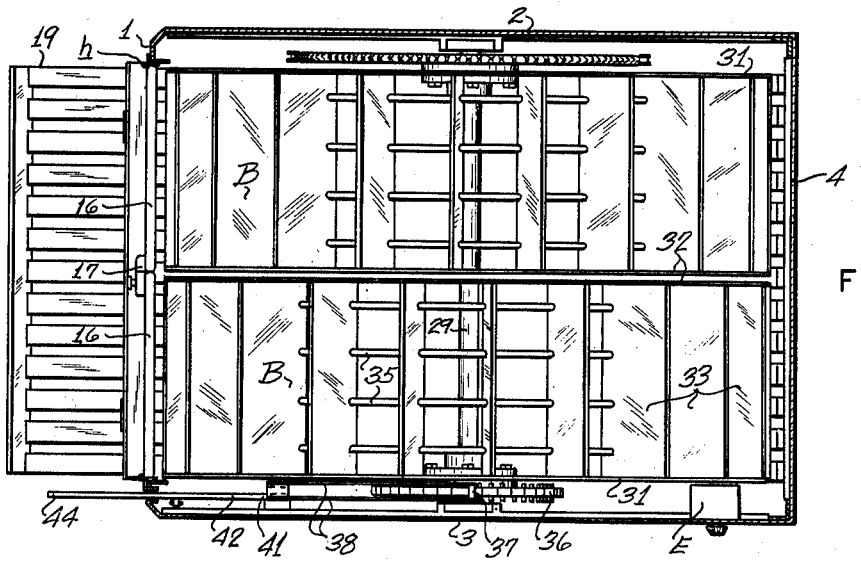
FIG. 6.
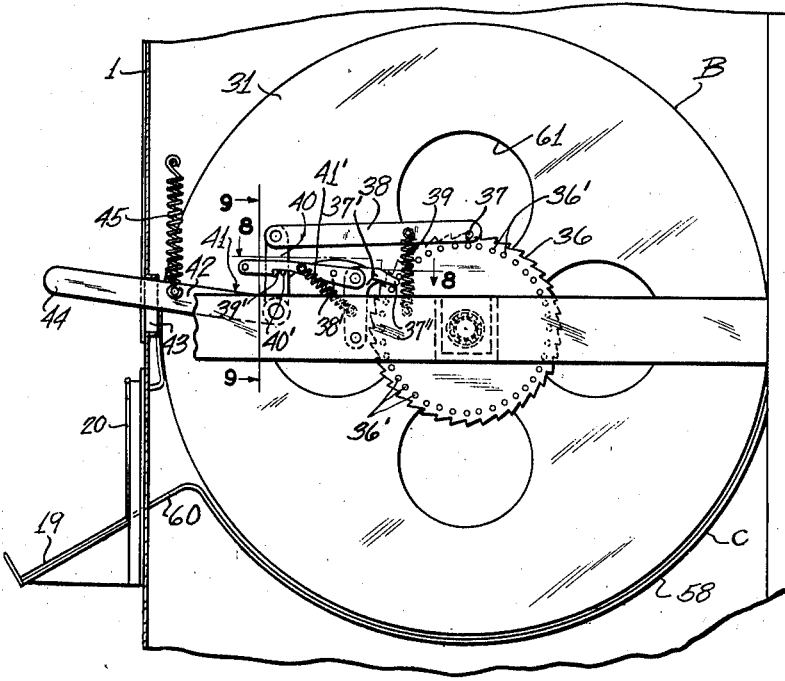
FIG. 7.
FIG. 9.
FIG. 8.
INVENTOR
HYMAN WAITZMAN
BY
ATTORNEY Patented Feb. 21, 1939

2,148,143

UNITED STATES PATENT OFFICE 2,148,143

METHOD OF KEEPING BAKED BREAD-LOAVES

Hyman Waitzman, Yonkers, N. Y., assignor to Purity Bakeries Corporation, Chicago, Ill., a corporation of Delaware Application June 13, 1938, Serial No. 213,400

2 Claims. (Cl. 99—90)

This invention relates to a certain new and useful method of keeping baked bread-loaves and the like.

It is common knowledge that the temperature and humidity of a baked bread-loaf and that of the surrounding atmosphere are constantly seeking adjustment,—to reach a condition of equilibrium, as it may be said. Hence, baked bread-loaves, even though wrapped or double wrapped, are affected as to their freshness and softness and eating qualities by the surrounding temperature and humidity and lose their softness and edibility and become hard and stale when permitted to remain for any great period upon, for instance, the open display-counter of a grocer or other merchant or retailer, resulting in economic loss particularly to the baker.

My present invention hence has for its object, and resides in, the provision of a method for eliminating such loss—for preserving and maintaining the softness and freshness of the baked loaf while displayed or stored for retail sale—for enabling the grocer or other retailer to furnish his customer with a baked loaf of bread in good condition, with substantially all the inherent goodness, freshness, flavor, and texture present in and possessed by the loaf when it leaves the bakery.

As a means for carrying out and practicing my method of fresh bread maintenance and dispensing, reference is made to the accompanying drawings, in which Figure 1 is a reduced perspective view of a fresh-loaf-maintaining and dispensing machine of my invention;

Figure 2 is a vertical sectional view of the machine, taken approximately along the line 2—2, Figure 1;

Figure 3 is a horizontal sectional view of the machine, taken approximately along the line 3—3, Figure 1;

Figure 6 is a horizontal sectional view of the machine, taken approximately along the line 6—6, Figure 4;

Figures 4, 5:
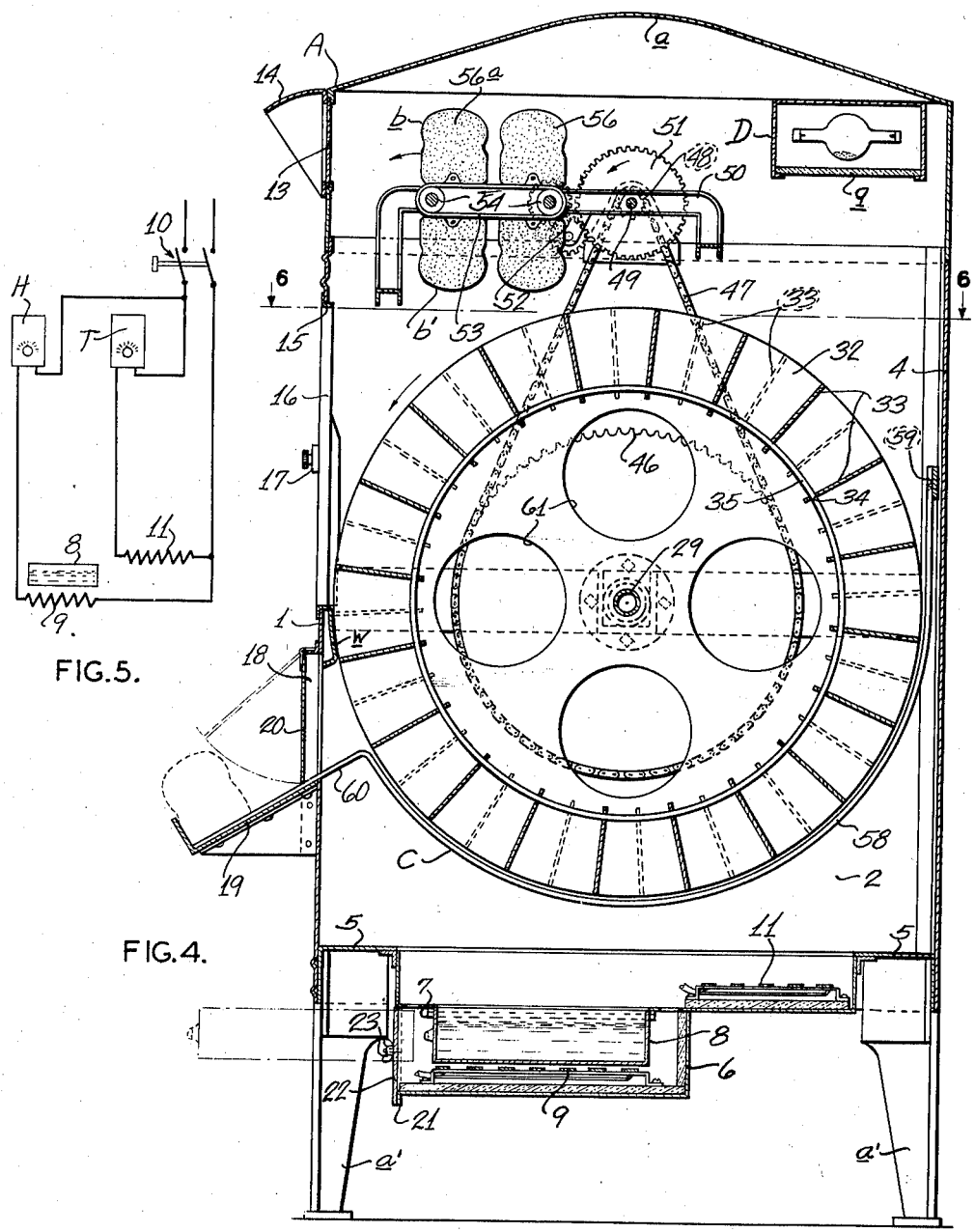
Figure 4 is a vertical sectional view of the machine, taken approximately on the line 4—4, Figure 2.
Figure 5 illustrates diagrammatically the electric wiring of the machine.

Figure 7 is a fragmentary elevational view, partly broken away and in section, of the machine; and Figures 8 and 9 are enlarged detail views, partly in section, of the machine, on lines 8—8 and 9—9, respectively, Figure 7.

Referring now in more detail and by reference characters to the drawings, the machine there illustrated includes a preferably rectangular cabinet or shell A having a rounded, more or less artistic top wall or dome a and supported on suitable legs a', the cabinet or shell A comprising a front wall 1, opposed parallel side walls 2, 3, a rear wall 4, and a bottom wall 5. Forming part of the bottom wall 5, is an open-top box-like compartment 6 provided with a pair of slide or track-members 7 for shiftably accommodating a water-container in the form of a suitable open-top receptacle or pan 8.

As best seen in Figure 4, the walls of the compartment 6 are preferably heat-insulated, and mounted in the compartment 6 beneath the receptacle 8, is an electric heating element 9 electrically connected in series with a conventional manually regulable humidostat H and a main switch 10.

Also mounted on the bottom shell wall 5, as also best seen in Figure 4, is a second electric heater element 11 similarly connected in series with a conventional manually regulable thermostat T and the main switch 10.

The shell front wall 1 is provided adjacent its upper margin with a centrally positioned window 13 preferably equipped with a suitable shade member 14; and formed in, and extending substantially across the entire width of, the wall 1 beneath the window 13, is a filling aperture 15. Hinged, as at h, upon the wall 1 for closure of the opening 15, is a companion pair of doors 16 equipped at their free margins with co-operable lock-members 17.

Also formed in the wall 1 beneath the filling-aperture 15, is a dispensing aperture 18. Fixed on the wall 1 at the lower margin of the opening 18, is an outwardly and obliquely downwardly presented discharge-chute 19, and hinged upon the wall 1 at the upper margin of the opening 18, is a free swinging curtain-flap or the like 20 forming, when closed, a substantially air-tight closure for the discharge opening 18.

The front wall 21 of the compartment 6 has an aperture normally closed by a cover 22 removably held in closure position by suitable wing-nuts or the like 23 for facilitating the introduction of water into the receptacle 8 for the replacement of water lost due to evaporation.

Fixed in the shell rear wall 4, is a suitable electrical connector member or socket 24 having electrical connection through a flexible conductor 25 with the switch 10 and the electrical heating-members or elements 9, 11.

Journaled at its ends in, and extending transversely between, the opposed shell-side-walls, is a main shaft 29, fixed upon which adjacent its opposite ends, are hub-members 30 supporting disc-shaped parallel end-plates 31, and also fixed on the shaft 29 adjacent the mid-point thereof, is a pair of parallel intermediate disc-shaped plates 32.

Arranged in a uniformly spaced circumferential series between respective pairs of the plates 31, 32, is a plurality of radially extending spacer-plates 33, each provided adjacent its inner margin with four uniformly spaced circular apertures 34, the apertures 34 of one plate 33 being in circumferential alignment or registration with the apertures 34 of the other plates 33 of the series for receiving a plurality of annular bars 35, thus providing a pair of adjacent skeleton drums or wheels B having a plurality of open radial pockets, each of suitable dimensions for receiving a baked bread-loaf or the like. As best seen in Figures 2 and 4 and for purposes presently more fully appearing, however, the spacer or pocket-forming plates 33 of one drum or wheel B are positioned in such alignment with respect to the corresponding spacer or pocket-forming plates 33 of the companion drum or wheel B as to present a so-called staggered appearance, the plates 33 of one drum B terminating midway between the plates 33 of the other drum B.

Fixed to one of the hubs 30 for rotation with the shaft 29, is a ratchet-wheel 36, co-operable with which is a ratchet-pin 37 fixed between a pair of spaced parallel pull bars 38 normally urged downwardly by means of a tension spring 39 and pivotally connected at their outer end to the vertical leg 40 of a bell crank 41, the horizontal leg 42 of which extends outwardly through a slot 43 in the cabinet front wall 1 and terminates in an outwardly extended handle 44, the bell crank 41 being normally held in upwardly disposed position by means of a tension spring 45.

The ratchet-wheel 36 is also provided with a circumferentially spaced series of pins 36' each radially aligned with, and corresponding to, a ratchet-tooth. Pivotally mounted on a part of the cabinet A as best seen in Fig. 7, is a dog 37' having a wedge-shaped projection 37" for snug-fitting disposition between any two of the pins 36', and being provided intermediate its ends with a pivoted latch bar 38' latchingly engageable, as shown in Fig. 7, with a latch-pin 39' and a lift-pin 40', both mounted in spaced horizontal alignment on the vertical leg 40 of the bell crank 41, the latch bar 38' being resiliently urged downwardly by means of a tension spring 41'.

It will be seen that, as the handle 44 is pulled downwardly to its lower limit of travel, the bell crank 41 will swing the pull-bars 38 forwardly and the pin 39' will pull the latch bar 38' forwardly, rocking the dog 37' out of engagement with the pins 36', thereby effecting, through the pin 37, rotatory movement of the ratchet-wheel 36 and its associated shaft 29 and bread-supporting drums B through a predetermined distance.

As the bell crank 41 reaches the limit of its travel, the lift-pin 40' will raise and release the latch bar 38', thereby permitting the dog 37' to return to initial position with its projection 37" disposed between the next succeeding pair of pins 36', as best seen in Fig. 7, for thus permitting only one loaf of bread to be discharged for each movement of the handle 44.

Fixed to the other or opposite hub 30, is a large toothed wheel 46 having connection by means of a sprocket chain 47 with a small pinion 48 fixed on one end of a short shaft 49 journaled between the shell side wall 2 and a cross-rib or beam 50 suitably fixed in the upper portion of the cabinet or shell A, as best seen in Figure 3. Fixed on the shaft 49, is a driving-gear 51 operably connected through a suitable train of gears 52 to a short belt conveyer 53, in turn, operatively trained over suitable rollers 54 journaled between the beam 50 and an opposed parallel cross beam or rib 55.

Suitably mounted on and carried for movement by the belt 53, is a plurality or series of so-called "dummy" loaves 56 simulating or imitating in appearance the genuine baked bread-loaves to be dispensed, as best seen in Figures 3 and 4, so relatively positioned that one thereof, now designated 56ᵃ, will be initially visually disposed in upright arrangement in front of the window 13. It will be evident, however, that, upon a single actuation of the handle 44, the toothed wheel 46 will be rotated and through the chain 47 will drive the belt 53 forwardly a sufficient distance to drop the imitative loaf 56ᵃ from the position shown at b to the position shown at b' in Figure 4.

Suitably fixed within the cabinet or shell A, is a semi-cylindrical frame C composed of a plurality of arcuate preferably metallic ribbon-members 58 secured at one end, as by screws 59, to the shell rear wall 4 and at their other end being bent outwardly and downwardly over, and suitably fixed to, the chute 19, the frame C thus not only partially surrounding the periphery of the drums B for loaf-retaining co-operation therewith, but also providing a slide, as at 60, for facilitating successive delivery of the loaves from the respective shells or drums B to and upon the chute 19, all as best seen in Figure 4.

In use and practice, the machine is stationed suitably within the grocery-store or other retail baked bread-loaf dispensing establishment or the like. Access being afforded by means of the doors 16, the baked loaves or the like to be dispensed are placed or stored within the pockets of the drums B by the bakery-representative, the drums B being suitably actuated for facilitating loading. Now, as will be readily understood by reference to Figure 4, each movement of the handle 44 will rotarily advance the bread-holding drums B half a space, and the carried or stored bread-loaves will alternately be delivered in succession from first one drum and then from the other, the series of bread-pockets of the drums B being, as previously stated, in staggered relation. Thus, as the several drum-pockets move successively into juxtaposed alignment with the delivery aperture 18, a particular spacer-plate 33 will come into radial alignment with the delivery slide 60 and a single bread-loaf will travel downwardly out of such particular pocket and across the delivery slide 60, the discharging loaf swinging the curtain flap 20 upwardly and traveling from shell A out onto the chute 19, where it may be readily picked up by the customer.

When the customer approaches the machine, one of the imitative loaves 56, as, for instance, the dummy-loaf 56a, is visible through the window 13, giving the customer an opportunity of seemingly viewing the genuine loaf which he or she is about to purchase. When the handle 44 is pulled down, the drums B begin to rotate, and such movement is transmitted through the chain 47 to the belt 53, whereupon the imitative loaf 56ᵃ moves quickly forwardly and downwardly away from the sight-opening or window 13. At approximately the same time, the real or genuine loaf, which the customer is purchasing, is discharged and accessibly delivered on the chute 19.

The several imitative loaves 56 are disposed on the belt 53 in timed relation with rotary movement of the loaf-delivery drums B, so that, as one imitative loaf seemingly drops from sight and onto the discharge chute 19, another imitative loaf is presented to view at the window 13. Thus, in each instance, the customer has the illusion of receiving the loaf which was actually viewed through the window 13, the sales appeal and efficiency of the machine being increased accordingly.

So much then for the dispensing machine proper. Now, if the machine were merely a dispensing or vending machine, the stored bread-loaves would more or less quickly, through a substantially spontaneous equilibrium movement of the air within and without the cabinet A, lose their freshness and desirable eating qualities. Hence, the cabinet A is uniquely equipped, as described, for surrounding the usually wrapped stored bread-loaves with moisture-laden atmosphere of proper degree of temperature for maintaining such loaves in substantially the same condition as when stored, irrespective of the atmospheric conditions surrounding the cabinet A itself.

Accordingly, the drums B being filled and the doors 16 closed, the receptacle 8 is water filled to the proper level and the connector plug 24 connected in any suitable manner to any conventional available source of electrical current (not shown). The heating element 9 under control of the humidostat H thereupon generates sufficient heat to produce within the cabinet A a controlled and limited amount of evaporation from the pan 8, so that the entire interior of the cabinet or shell A becomes humidified. Similarly the heater 11 under control of the thermostat T will generate sufficient dry heat, whereby the temperature is, at the same time, maintained at the desired degree. I have found in this connection that the optimum temperature and humidity conditions are such that the wet bulb temperature should be 80° F. and the dry bulb temperature 85° F., and that, so long as the temperature differential between the wet and dry bulb thermometer is held substantially at five degrees, the temperature range maintained within the cabinet or shell may be varied from 80° F. to 110° F. without seriously impairing the stored bread-loaves.

Thus, according to my method of bread-loaf preservation and distribution, a desired relative humidity and temperature are maintained within the cabinet A, whereby the stored bread-loaves, whether wrapped or unwrapped, are caused, as it may be said, to retain the freshness and other desirable qualities possessed by the loaves when stored, so that, when the stored loaves are discharged from the cabinet A, the successively delivered loaves possess substantially all the goodness—all the freshness—softness—flavor—and other desirable eating qualities that the baker endeavors so earnestly and persistently to give his bread.

I may add that, to retard or kill mold growth that might possibly develop within the cabinet A by reason of the contained high temperature and high relative humidity,—to effect a substantially sterile atmosphere within the cabinet A, I mount within the cabinet A, at any suitable free space, preferably near the top, an ultra-violet ray generator D constructed in any conventional manner, having the usual quartz window q and being connected to any suitable power source (not shown).

As best seen in Figure 4, the drum walls or discs 31 and 32 are formed with cut-outs or the like 61, which, with the skeleton form of the drums B, freely expose the stored bread-loaves to the atmospheric conditions within the cabinet. Preferably, as best seen in Figure 4, an arcuate wall w is suitably provided within the cabinet A to prevent accidental displacement of the carried bread-loaves as the drums B rotate, and it should be understood that changes and modifications in the machine and method may be made and substituted herein without departing from the nature and principle of my invention.

Having thus described my invention, what I claim and desire to secure by Letters Patent is,—

1. That method of handling a wrapped fresh baked bread-loaf while held for consumer purchase which comprises disposing the wrapped loaf in, and surrounding the same by, a confined substantially static atmosphere, and subjecting the wrapped loaf to such surrounding atmosphere the relative humidity and temperature of which are maintained respectively between 70% and 85% and 80° F. (dry bulb) and 110° F. (dry bulb) by the supplying to said atmosphere, without mechanically effecting circulation thereof, of controlled heat and independently controlled and heated vapor for maintaining the freshness of the loaf.

2. That method of handling a wrapped fresh baked bread-loaf while held for consumer purchase which comprises disposing the loaf in, and surrounding the same by, a confined substantially static atmosphere, hubjecting the wrapped loaf to such surrounding atmosphere the relative humidity and temperature of which are maintained respectively between 70% and 85% and 80° F. (dry bulb) and 110° F. (dry bulb) by the supplying to said atmosphere, without mechanically effecting circulation thereof, of controlled heat and independently controlled and heated vapor for maintaining the freshness of the loaf, and sterilizing such atmosphere by means of light radiation.

HYMAN WAITZMAN.